(12) United States Patent
Göbel et al.

(10) Patent No.: US 6,433,072 B1
(45) Date of Patent: Aug. 13, 2002

(54) PIGMENT PASTE, PASTE RESIN, COATING AGENTS AND THE USE THEREOF

(75) Inventors: Armin Göbel, Wetter; Bettina Vogt-Birnbrich, Solingen, both of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/582,479

(22) PCT Filed: Sep. 24, 1999

(86) PCT No.: PCT/EP99/07110

§ 371 (c)(1),
(2), (4) Date: Aug. 1, 2000

(87) PCT Pub. No.: WO00/24836

PCT Pub. Date: May 4, 2000

(30) Foreign Application Priority Data

Oct. 26, 1998 (DE) .......................................... 198 49 321

(51) Int. Cl.$^7$ ............................................... C08L 75/00
(52) U.S. Cl. ..................................................... 524/591
(58) Field of Search .................................. 524/489, 591

(56) References Cited

U.S. PATENT DOCUMENTS

| | | | | |
|---|---|---|---|---|
| 4,605,725 A | * | 8/1986 | Christman | ................. 528/77 |
| 5,281,655 A | * | 1/1994 | Mitsuji | ...................... 524/507 |
| 5,872,203 A | * | 2/1999 | Wen | ............................ 528/66 |
| 5,880,209 A | | 3/1999 | Patzchke et al. | ............ 524/541 |

* cited by examiner

Primary Examiner—Paul R. Michl
(74) Attorney, Agent, or Firm—Sudhir G. Deshmukh

(57) ABSTRACT

A pigment paste containing water-dilutable hydroxy-functional polyurethaneurea paste resins with a urea group content (calculated as —NHCONH—) of 10 to 300 mmol, a urethane group content (calculated as —NHCOO—) of 20 to 300 mmol, each per 100 g of solid resin, an OH value of 20 to 250 mg KOH/g, an acid value of 15 to 80 and a molecular weight Mn of 1000 to 20000 obtainable by I) preparing a NCO group-containing polyurethane pre-polymer by reacting
   a1) hydroxy-functional compounds with a molecular weight (Mn) of 360 to 8000 with
   a2) polyisocyanates and
   a3) compounds with at least one group which can react with isocyanate and at least one ionic group,
II) subsequent reaction of the prepolymer with
   a4) hydroxy-functional monoamines and optionally polyols and
III) neutralisation of groups which can be converted into ionic groups.

9 Claims, No Drawings

PIGMENT PASTE, PASTE RESIN, COATING AGENTS AND THE USE THEREOF

BACKGROUND OF THE INVENTION

The invention provides pigment pastes and resin pastes for incorporating into aqueous surface coating agents, in particular for incorporating into aqueous basecoat lacquers and aqueous topcoat lacquers and also coating agents containing the pigment pastes. The pigment pastes and surface coating agents containing them may advantageously be used in the vehicle and industrial lacquering sector for coating plastics and metal substrates.

When preparing stable pigmented aqueous basecoat lacquers, the pigments have to be well wetted and finely milled and distributed in a stable manner in appropriate dispersing equipment in order to prevent agglomeration or sedimentation of the pigments. When using low-solvent water-dilutable dispersions or emulsions, the shear forces may not act effectively due to the very low viscosities. In addition, the fact that water-dilutable, high molecular weight dispersions or emulsions are not always shear-stable in dispersing equipment has to be taken into account. In this case, therefore, some of the binder being used has to be replaced by a paste resin (pigment paste resin), into which the pigments are rubbed. The pigment pastes or milled pastes obtained in this way are then mixed with the main binder ("lacquered up" or completed).

The paste resins mentioned then have to satisfy a number of requirements. For example, the paste binders should be highly compatible with the main binder(s) and not alter, in a detrimental manner, the properties of the lacquer when added in the requisite amounts. They should exhibit a good wetting capacity for the particular pigments, be storage-stable for a relatively long period and cause no colour changes in the lacquer. In particular for the production of repair lacquers from standardised mixed lacquers, it is very important to use lacquer concentrates with readily reproducible coloristic and technological properties in order to produce the desired shade of colour economically and without unreasonable use of the colorant.

Various binders which are suitable for use as paste resins and which are used in aqueous basecoat or aqueous topcoats have already been described. Thus, in EP-A-0 260 447, polyester resins, acrylate resins and/or amine/forrnaldehyde condensation resins are used as pigment paste resins for preparing aqueous basecoat lacquers. As the main binder, the aqueous basecoat lacquers contain acrylated polyesters and polyurethane resins. The pigment paste resins described here are not always fully compatible with the main binder, which can lead to an impairment of the metallic effect when formulating metallic lacquers.

Pigment pastes based on water-dilutable polyurethane paste resins are described in EP-A-0 299 148, wherein the polyurethane resins are prepared from polyesterpolyols in which the acid component contains at least 50 wt. % of long-chain carboxylic acids with 18–60 carbon atoms in the molecule.

EP-A-0 438 090 describes pigment paste resins based on water-dilutable polyesterurethanes, wherein the polyesteru-rethanes are obtained by reacting carboxyl group-free poly-esterpolyols and low molecular weight diols, wherein at least some of the low molecular weight diols contain acid groups capable of forming anions, with diisocyanates.

The disadvantage of the pigment paste resins mentioned is that pigment pastes formulated with them, in particular white pastes, produce lacquers with defective covering capacity. Also, the known paste formulations pose serious problems when making up a deep black. Furthermore, both the known paste resins and also the pigment pastes formulated therewith are not frost-resistant and the resistance to chemicals of aqueous lacquers formulated with these paste resins and the surface coatings obtained therefrom require some improvement. From time to time, when preparing paste resin dispersions, insufficient solids contents are produced which, inter alia, can impair the processability and make them less economically viable.

Thus, the object of the invention was to provide pigment pastes, for incorporation into aqueous surface coating agents, which are very compatible with a large number of different binder systems and also exhibit very good pigment-ing and wetting powers and as a result enable the energy- and time-saving production of pigmented lacquers. The pigment pastes should be readily processable, produce lacquers with very good covering capacity and enable the formulation of a deep black. The pigment pastes and also the aqueous lacquers prepared therefrom should be storage-stable and frost-resistant. Surface coatings with a high gloss, a good metallic effect and very high hardness and resistance to chemicals should be obtained.

SUMMARY OF THE INVENTION

The object is achieved by a pigment paste, containing paste resin and pigments in a pigment to binder ratio by weight of 0.3:1 to 20:1, preferably 0.5:1 to 15:1, particularly preferably 0.8 to 1 to 12:1, and optionally water, organic solvent and/or conventional lacquer additives, which is characterised in that it contains, as a paste resin, one or more water-dilutable hydroxy-functional polyurethaneurea resins with a urea group content (calculated as —NHCONH—) of 10 to 300, preferably 20 to 250 mmol in 100 g of solid resin, a urethane group content (calculated as —NHCOO—) of 20 to 300, preferably 80 to 250 mmol in 100 g of solid resin, an OH value of 20 to 250, preferably 40 to 200, particularly preferably 60 to 150, an acid value of 15 to 80, preferably 18 to 65, particularly preferably 19 to 45 and a number average molecular weight Mn of 1000 to 20000 g/mol, preferably 1500 to 15000 g/mol, which are obtainable by I) preparing a NCO group-containing polyurethane pre-polymer by reacting
 a1) one or more hydroxy-functional compounds with a number average molecular weight (Mn) of 360 to 8000, preferably 500 to 5000 g/mol, with
 a2) one or more polyisocyanates and
 a3) at least one compound with at least one group which can react with isocyanate and at least one group which is ionic or capable of forming ions,
II) subsequent reaction of the NCO group-containing polyurethane prepolymer with
 a4) one or more hydroxy-functional monoamines and also optionally with one or more polyols in ratios by weight such that the resulting polyurethane has the required hydroxyl values and proportions of urea and urethane groups,
III) at least partial neutralisation of the ionic groups or groups which can be converted into ionic groups in the polyurethane obtained, before or after reaction in stage II, and transfer of the reaction product obtained to the aqueous phase.

The water-dilutable hydroxy-functional polyurethaneurea resins contained in pigment pastes according to the invention and their preparation will be described in the following.

The invention also provides preparation of the water-dilutable polyurethaneurea paste resins. Here, a NCO-functional polyurethane prepolymer is prepared in a first stage (I). The polyurethane prepolymer is obtained by reacting components a1) to a3).

Component a1) for preparing NCO-functional polyurethane prepolymers consists of hydroxy-functional linear or branched compounds, which preferably have an OH-functionality of 2 to 3, particularly preferably of 2, an OH value of 50 to 250 and a number average molecular weight (Mn) of 360 to 8000 g/mol, preferably 500 to 5000 g/mol.

The invention also relates to the paste resins obtainable by this procedure.

DETAILED DESCRIPTION OF THE INVENTION

The following may be used as component a1): polyesterpolyols, polycarbonatepolyols, polyetherpolyols, polylactonepolyols and/or poly(meth)acrylatepolyols or the corresponding diols. The polyols and diols may each be used separately or in combination with each other.

Polyesterpolyols, e.g. polyesterdiols, are preferably used as component a1). Particularly preferably, they are linear polyesterpolyols, in particular linear polyesterdiols.

The polyesterpolyols may be prepared in a conventional manner known to a person skilled in the art, for example by polycondensation from organic dicarboxylic acids or their anhydrides and organic polyols. The dicarboxylic acids and polyols may be aliphatic, cycloaliphatic and/or aromatic in nature.

The acid component for preparing polyesterpolyols preferably consists of low molecular weight dicarboxylic acids or their anhydrides with 2 to 17, preferably less than 16, particularly preferably less than 14 carbon atoms in the molecule. Suitable dicarboxylic acids are, for example, phthalic acid, isophthalic acid, alkylisophthalic acids, terephthalic acid, hexahydrophthalic acid, adipic acid, trimethyladipic acid, azelaic acid, sebacic acid, fumaric acid, maleic acid, glutaric acid, succinic acid, itaconic acid and 1,4-cyclohexanedicarboxylic acid. The corresponding anhydrides, if they exist, may also be used instead of the acids. In order to produce branched structures, a proportion of higher functional carboxylic acids may also be used, e.g. trifunctional carboxylic acids such as trimellitic acid, malic acid and dimethylolpropionic acid.

Polyols which can be used to prepare the polyesterpolyols are preferably diols, for example glycols such as ethylene glycol, propane-1,2-diol, butane-1,2- 1,3- and 1,4-diol, 2-ethylenepropane-1,3-diol, hexane-1,6-diol, cyclohexane-1,2- and 1,4-diol, hydrogenated bisphenol A and neopentyl glycol.

The diols may optionally be modified by small amounts of higher-hydric alcohols.

Examples of higher-hydric alcohols which may be used are trimethylolpropane, pentaerythritol, glycerol and hexanetriol. Small amounts of monohydric alcohols may also be used, as chain terminators, for example those with 1 to 18 carbon atoms in the molecule such as propanol, butanol, cyclohexanol, n-hexanol, benzyl alcohol, isodecanol, saturated and unsaturated fatty alcohols.

Reaction of the components is performed in ratios by weight such that the desired OH values are obtained for the polyesterpolyols.

Polyesterpolyols which are substantially carboxyl group-free are preferred. They may have acid values of, for example, <3, preferably <1. However, it is also possible that the polyesterpolyols contain carboxyl groups, for example they may then have acid values of 5 to 50 mg KOH/g. The carboxyl groups may be introduced via di- or trifunctional carboxylic acids, such as e.g. trimellitic acid, malic acid, and dihydroxymonocarboxylic acids such as e.g. dimethylolpropionic acid.

The polyesterpolyols may be used individually or combined with each other.

Polycarbonatepolyols are also preferred as component a1), in particular polycarbonatediols.

Polycarbonatepolyols are esters of carbonic acid which are obtained by the reaction of carbonic acid derivatives, e.g. diphenyl carbonate or phosgene, with polyols, preferably diols. Suitable diols are, for example, ethylene glycol, propane-1,2- and 1,3-diol, butane-1,4- and 1,3-diol, hexane-1,6-diol, neopentyl glycol, 2-methylpropane-1,3-diol and 1,4-bishydroxymethylcyclohexane.

The polycarbonatepolyols may be used individually or combined with each other.

Polyetherpolyols and/or polylactonepolyols are also very suitable as component a1).

Suitable polyetherpolyols are, for example, polyetherpolyols of the following general formula:

in which $R^4$ represents hydrogen or a lower alkyl group (e.g. $C_1$ to $C_6$), optionally with various substituents, n=2 to 6 and m=10 to 50. The $R^4$ groups may be identical or different. Examples of polyetherpolyols are poly(oxytetramethylene) glycols, poly(oxyethylene)glycols and poly(oxypropylene) glycols or mixed block copolymers which contain different oxytetramethylene, oxyethylene and/or oxypropylene units.

The polyetherpolyols may be used individually or combined with each other.

Polylactonepolyols are polyols, preferably diols, which are derived from lactones, preferably caprolactones. These products are obtained, for example, by reacting ε-caprolactone with a diol. Polylactonepolyols are characterised by repeating polyester fragments which are derived from the lactone. These repeating molecular fragments may correspond, for example, to the following general formula:

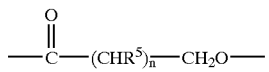

wherein n is preferably 4 to 6 and $R^5$ is hydrogen, an alkyl group, a cycloalkyl group or an alkoxy group and the total number of carbon atoms in the substituents in the lactone ring does not exceed 12. Preferably used lactones are ε-caprolactones in which n has the value 4. Unsubstituted ε-caprolactone is particularly preferred. The lactones may be used individually or in combination.

Diols which are suitable for reacting with lactones are e.g. ethylene glycol, propane-1,3-diol, butane-1,4-diol and dimethylolcyclohexane.

The polylactonepolyols may be used individually or combined with each other.

Furthermore, poly(meth)acrylatepolyols may also be used as component a1). Poly(meth)acrylatepolyols are polymers produced, by radical polymerisation, from hydroxy-functional (meth)acrylates and other radically polymerisable unsaturated monomers. Poly(meth)acrylatepolyols may preferably be used which have a selective structure with terminal OH groups, resulting from the special method of preparation. The poly(meth)acrylatepolyols may also be used individually or combined with each other.

In addition, one or more low molecular weight alcohols, preferably difunctional alcohols with a molecular weight of 62 to 356 g/mol may optionally also be used in component a1). Examples of these are ethylene glycol, propane-1,2- and 1,3-diol, butane-1,3- and 1,4-diol, hexane-1,6-diol, octane-1,8-diol, cyclohexane-1,2- and 1,4-diol, dimethylolpropane, neopentyl glycol, cyclohexanedimethanol and hydroxyethylated or hydroxypropylated bisphenol A or bisphenol F.

Any organic polyisocyanates, preferably diisocyanates, individually or in combination, may be used as component a2) for preparing the NCO-functional prepolymers. The polyisocyanates may be of an, e.g. aromatic, aliphatic and/or cycloaliphatic nature. They may also be ether or ester group-containing diisocyanates. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 1-isocyantomethyl-5-isocyanato-1,3,3-trimethylcyclohexane, bis-(4-isocyanato-phenyl)-methane, norbornene diisocyanate, 4,4-diisocyanato-diphenyl ether, 1,5-dibutylpentamethylene diisocyanate, 2,3-bis-(8-isocyanatooctyl)-4-octyl-5-hexylcyclohexane, 3-isocyanatomethyl-1-methylcyclohexyl isocyanate and/or 2,6-diisocyanatomethylcapronate.

Non-yellowing and/or sterically hindered isocyanates with 4 to 25, preferably 6 to 16 carbon atoms, which contain, in the alpha position to the NCO group, one or two linear, branched or cyclic alkyl groups with 1 to 12, preferably 1 to 4 carbon atoms as substituents in the basic structure, may also be used. The basic structure may consist of an aromatic or alicyclic ring or of an aliphatic linear or branched carbon chain with 1 to 12 carbon atoms. Examples of these are isophorone diisocyanate, bis-(4-isocyanatocyclohexyl) methane, 1,1,6,6-tetramethyl-hexamethylene diisocyanate, 1,5-dibutyl-pentamethylene diisocyanate, 3-isocyanatomethyl-1-methyl-cyclohexyl isocyanate, p- and m-tetramethylxylylene diisocyanate and/or the corresponding hydrogenated homologues.

Components a3) for preparing the NCO-functional prepolymers are preferably low molecular weight compounds which contain at least one, preferably more than one, particularly preferably two groups which can react with isocyanate and at least one group which is ionic or capable of forming ions. These compounds may either be used as chain terminators or they are incorporated into the chain. Suitable groups which are capable of forming anions are e.g. carboxyl, phosphoric acid and sulfonic acid groups. Preferred anionic groups are carboxyl groups. Suitable groups which are capable of forming cations are, for example, primary, secondary and tertiary amine groups or onium groups such as quaternary ammoniun, phosphonium and/or tertiary sulfonium groups. Groups which are anionic or capable of forming anions are preferred.

Hydroxyl groups and/or secondary amine groups in particular are suitable groups capable of reacting with isocyanate.

Preferred compounds which are suitable for use as component a3) are those which contain carboxyl and hydroxyl groups. Examples of such compounds are hydroxyalkanoic acids of the following general formula:

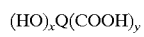

in which
Q is a straight or branched hydrocarbon group with 1 to 12 carbon atoms and x and y are each 1 to 3. Examples of these are citric acid and tartaric acid. Carboxylic acids in which x=2 and y=1 are preferred.

A preferred group of dihydroxyalkanoic acids are α,α-dimethylolalkanoic acids.

α,α-dimethylolpropionic acid and α,α-dimethylolbutyric acid are preferred.

Further examples of dihydroxyalkanoic acids which can be used are dihydroxypropionic acid, dimethylolacetic acid, dihydroxysuccinic acid or dihydroxybenzoic acid.

Further compounds which can be used as component a3) are amino group-containing acids, for example α,α-diaminovaleric acid, 3,4-diaminobenzoic acid, 2,4-diaminotoluenesulfonic acid and 4,4-diamino-diphenylethersulfonic acid, and dihydroxy compounds which contain a tertiary and/or quaternary amine group, such as for example N-methyldiethanolamine, N-methyl-diisopropanol and 2-N, N-dimethylamino-2-ethyl-propane-1,3-diol.

The reaction of components a1), a2) and a3) with each other takes place in a conventional manner which is known to a person skilled in the art, for example at temperatures of 50 to 120° C., preferably 70 to 100° C., optionally with the addition of catalysts.

Components a1), a2) and a3) are used in amounts such that a reaction product with free isocyanate groups is obtained, i.e. an excess of polyisocyanate is used. For example, a ratio by equivalents of NCO groups to OH groups of 1.1:1 to 2.0:1, preferably 1.2:1 to 1.9:1 is used.

The NCO group-containing polyurethane prepolymer obtained in stage I is then reacted with component a4) in a further stage II) and thus is converted into a urea group-containing and hydroxy-functional polyurethane. Component a4) comprises one or more hydroxy-functional monoamines, each with a primary or secondary amine group. The hydroxy-functional monoamines may optionally be used together with one or more polyols. Reaction preferably takes place with complete consumption of the amine groups. Monoamines which can be used contain one, or preferably more, hydroxyl groups. These may be, for example alkanolamines, dialkanolamines, alkylalkanolamines and/or arylalkanolamines with at least 2 and not more than 18 carbon atoms in the alkanol, alkyl and aryl groups. Examples of monoamines with one hydroxyl group which can be used are monoethanolamine, N-methylethanolamine, 3-amino-1-propanol, 2-amino-2-methylpropanol, 3-amino-2,2-dimethylpropan-1-ol, 2-amino-2-ethyl-propane-1,3-diol, N-phenylmethanolamine and N-cyclohexylethanolamine. Examples of monoamines with two and more hydroxyl groups are diethanolamine, diisopropanolamine and 2-amino-2-hydroxymethylpropane-1,3-diol.

The hydroxyamines and optionally present polyols (component a4)) are used in an amount such that OH values of 20 to 250, preferably 40 to 200, particularly preferably 60 to 150 and urea group contents (—NHCONH—) of 10 to 300, preferably 20 to 250 mmol in 100 g of solid resin, result in the reaction product obtained. In this case, complete reaction is striven for with a virtually equivalent molar ratio of reactive amine groups to isocyanate groups. Optionally, a very small NCO excess may be used. The ratio by equivalents of NCO groups to amine groups should be less than 1.05:1, but it is preferably 1:1.

Reaction takes place at temperatures of 30 to 80° C., preferably 30 to 50° C.

The polyols used in addition to hydroxyamines may be used to introduce hydroxyl groups into the polyurethane.

They are preferably low molecular weight alcohols with 2 or more hydroxyl groups. Examples of these are neopentyl glycol, trimethylolpropane, pentaerythritol, dipentaerythritol, glycerol, neopentyl glycol hydroxypivalate, 2-ethyl-2-methylpropane-1,3-diol, hexane-1,6-diol, cyclohexanedimethanol and ditrimethylolpropane.

A polyurethaneurea resin with the previously mentioned urea and urethane group contents, molecular weight and OH values is obtained by reacting NCO-functional polyurethane prepolymers with aminoalcohols and optionally further polyols. The polyurethaneurea resins have acid values of 15 to 80, preferably 18 to 65, particularly preferably 19 to 45.

However, it is also possible to introduce a proportion of cationic groups into the polyurethaneurea resin, in addition to the anionic groups. In this case, the number of equivalents of cationic groups present should be only a fraction of the number of equivalents of anionic groups. The cationic groups are particularly preferably tertiary and/or quaternary amine groups. For example, 0.05 to 25%, preferably 0.1 to 10% of cationic groups, with respect to equivalents of anionic groups, may be present. The introduction of additional cationic groups may be performed, for example, by reacting the NCO prepolymer with compounds with at least one hydroxyl group and a tertiary or quaternary amine group. The procedure may be such that, for example, the compounds with tertiary and/or quaternary amine groups mentioned are reacted with the NCO prepolymer together with the aminoalcohols. Examples of compounds with at least one hydroxyl group and a tertiary or quaternary amine group are N-methyldiethanolamine, N-methyldiisopropanol and 2-N,N-dimethylamino-2-ethyl-propane-1,3-diol.

In order to produce sufficient water-dilutability, the groups which are ionic or can be converted into ionic groups in the polyurethaneurea resin are at least partly neutralised in a further stage III. Neutralisation may be performed before or after reaction with the hydroxyamines. The polyurethane resins preferably contain anionic groups. The anionic groups are neutralised with bases. Preferred examples of basic neutralising agents are tertiary amines such as trimethylamine, triethylamine, dimethylethylamine, dimethylbutylamine, N-methylmorpholine, dimethylethanolamine and dimethylisopropanolamine. Isocyanate group-free polyurethaneurea resins may also be neutralised with amines which contain isocyanate-reactive groups, e.g. with primary or secondary amines or aminoalcohols.

After neutralisation, the polyurethane resin is transferred to the aqueous phase. However, neutralisation and transfer to the aqueous phase may also take place simultaneously.

The polyurethaneurea resin is present in the aqueous phase in a colloidal state and has a structurally viscous behaviour. The latter means that the viscosity decreases with increasing rate of shear. The viscosity of the polyurethaneurea dispersion is 0.5 to 10 Pas, measured with a rate of shear of 231 $s^{-1}$ and a solids content of 35 wt. %. The degree of neutralisation is preferably 60 to 120%, particularly preferably 70 to 100%. The aqueous resin dispersion has a solids content of preferably 25 to 50 wt. %, particularly preferably 28 to 42 wt. %.

The particle size of the polyurethaneurea resin in the aqueous phase is preferably in the range 25 to 200 nm, particularly preferably 30 to 100 nm. The aqueous polyurethaneurea dispersion may preferably have the following composition, for example:

20 to 50 parts by wt. of polyurethaneurea resin
0.3 to 18 parts by wt. of neutralising agent, preferably ammonia and/or amine
4 to 25 parts by wt. of one or more organic solvents which are at least partly miscible with water and
5 to 75 parts by wt. of water.

Optionally, the water-dilutable polyurethaneurea paste resin may also be used in pigment pastes in accordance with the invention in combination with proportions of other paste resins, which may optionally be OH-functional. The other paste resins may be, for example, melamine resins, polyester resins, poly(meth)acrylates and/or optionally modified polyurethane resins which differ from the previously described polyurethane resins.

One form of development of the invention comprises using the previously defined water-dilutable hydroxy-functional polyurethane paste resins in combination with polyetherpolyols with a number average molecular weight (Mn) of 400 to 5000, preferably 500 to 3000 g/mol. For example, this paste resin composition may then contain 2.0 to 25 wt. %, preferably 3.0 to 20 wt. %, particularly preferably 4 to 15 wt. %, of polyetherpolyols, with respect to the solids content of the amount of polyurethane resin used.

Examples of suitable polyetherpolyols are poly(oxytetramethylene)glycols, poly(oxyethylene)glycols, poly(oxypropylene)glycols or mixed block copolymers which contain different oxytetramethylene, oxyethylene and/or oxypropylene units. Polyetherpolyols which are obtained without the joint use of ethylene oxide, in particular with the exclusive use of propylene oxide or tetrahydrofuran, are preferred. The use of polyoxypropyleneglycols with molecular weights of 500 to 3000 g/mol is particularly preferred. Different polyetherpolyols may be combined with each other.

This paste resin composition may be prepared from polyurethane paste resin and polyetherpolyols by mixing the two components. This may be achieved in a variety of ways. Thus, it is possible to add the polyetherpolyols to the water-dilutable polyurethane paste resin before, during or after the production of an emulsion, i.e. before, during or after transfer of the water-dilutable polyurethane paste resin to the aqueous phase. The mode of operation is preferably such that the polyetherpolyols are admixed with the water-dilutable polyurethane paste before transfer to the aqueous phase. If the addition of polyetherpolyols takes place before transfer to the aqueous phase, then the mode of operation may be such that the polyetherpolyols are added to the NCO prepolymer together with the hydroxy-functional monoamines. The reaction conditions for reacting NCO prepolymers with the hydroxy-functional monoamines are then chosen, in a manner which is familiar to a person skilled in the art, so that the NCO groups react only with the amine groups.

Pigment pastes according to the invention contain pigments. The pigments may be colour and/or effect-providing pigments. Suitable colour-providing pigments are any conventional lacquer pigments of an organic or inorganic nature. Examples of inorganic or organic colour-providing pigments are titanium dioxide, micronised titanium dioxide, iron oxide pigments, carbon black, azo pigments, phthalocyanin pigments, quinacridone or pyrrolopyrrol pigments. Examples of effect-providing pigments are metal pigments, e.g. consisting of aluminium, copper or other metals; interference pigments such as, e.g. metal oxide coated metal pigments, e.g. titanium dioxide coated or mixed oxide coated aluminium, coated mica such as e.g. titanium dioxide coated mica and graphite effect pigments.

Concentrated colour shade pastes are preferably prepared with the hydroxy-functional polyurethaneurea pastes.

Pigments pastes according to the invention may contain water and also small amounts of organic solvents and conventional lacquer additives.

The optionally present solvents in pigment paste are conventional lacquer solvents. These may arise from preparation of the paste binder or be added separately. They are preferably at least partially water-miscible solvents. Examples of suitable solvents are monohydric or polyhydric alcohols, e.g. propanol, butanol, hexanol; glycol ethers or esters, e.g. diethylene glycol dialkyl ethers, dipropylene glycol dialkyl ethers, each with $C_1$ to $C_6$ alkyl groups, ethoxypropanol, butoxyethanol, glycols, e.g. ethylene glycol, propylene glycol and their oligomers, N-methylpyrrolidone and also ketones e.g. methyl ethyl ketone, acetone, cyclohexanone. The solvents may contain small proportions of aromatic or aliphatic hydrocarbons such as e.g. toluene, xylene or linear or branched $C_6$–$C_{12}$ hydrocarbons. The proportion of organic solvent present is, for example, at most 10–15 wt. %, with respect to the entire pigment paste.

Various lacquer additives may already be incorporated into the pigment paste according to the invention. The additives are additives which are conventionally used in the lacquer sector and which are known to a person skilled in the art. Examples of additives which may advantageously already be incorporated into the pigment paste are dispersants, wetting agents, defoamers, catalysts and substances for adjusting the pH.

The pigment to binder ratio by weight in the pigment paste is 0.3:1 to 20:1, preferably 0.5:1 to 15:1, particularly preferably 0.8:1 to 12:1. The ratio depends, for example, on the type and particle size of the pigments being used. In the case of formulations with finely divided transparent pigments and carbon black, for example, a pigment to binder ratio of 0.8:1 to 2.0:1 may be used, and in the case of formulations with coarsely divided, covering pigments, e.g. with titanium dioxide, a pigment to binder ratio of 5:1 to 7:1 is used. In the case of formulations with metal effect pigments, e.g. with aluminium pigments, the pigment to binder ratio may be adjusted, for example, to 1.5:1 to 2.5:1.

Pigment pastes according to the invention may be prepared in a conventional manner. Thus, the individual constituents of the pigment paste are mixed with each other and then milled in known milling equipment, e.g. stirred rotary disc units, triple roll mills, ball mills, sand mills or pearl mills. This procedure is applied in particular when colour-providing pigments are used. The units, dispersion times and other dispersion conditions depend substantially on the pigments being used. If pigment pastes with effect-providing pigments, e.g. with aluminium pigments or interference pigments, are intended to be prepared, simple stirring together or mixing of the pigments with the paste binder and optionally the other constituents in the pigment paste is sufficient.

The optimum composition of the milled product is provided by the appropriate combination of the main constituents in the pigment paste (pigment, paste resin, water, optionally organic solvents and additives) and is adjusted to the particular milling equipment and the particular pigment in a manner known to a person skilled in the art. For example, there may be proportions of solids of 25 to 85 wt. % in the pigment paste, depending on the pigment actually used.

The pigment paste according to the invention may preferably contain, for example, 5 to 90 parts by wt. of pigment and 10 to 95 parts by wt. of the aqueous polyurethane urea composition. In addition, for example, 0 to 40 parts by wt. of water, 0 to 10 parts by wt. of organic solvent, 0 to 5 parts by wt. of neutralising agent and 0 to 5 parts by wt. of auxiliary substances may be added. The previously mentioned parts by weight are intended to add up to 100 parts by weight.

The invention also provides aqueous surface coating agents which contain pigment pastes according to the invention. To prepare the aqueous surface coating agents, the pigment pastes are completed or lacquered up with further binder, the actual main binder. Suitable lacquering-up binders are any water-dilutable binders which are compatible with the paste resin and which are normally used to prepare aqueous basecoat lacquers and aqueous topcoats for the vehicle and industrial lacquering sector. Examples of water-dilutable resins which can be used are polyurethane resins, polyesterurethane resins, fatty acid modified polyesterurethane resins, acrylated polyurethane resins and/or acrylated polyester resins and also poly(meth)acrylate resins. The lacquering-up binders may be used individually or as a combination. Polyurethane resins and modified polyurethane resins are preferably used. Mixtures of different polyurethane resins are particularly preferably used. However, it is also possible to use the polyurethane resin in combination with other water-dilutable resins, e.g. with water-dilutable polyacrylate resins and/or polyester resins. Suitable polyurethane resins and suitable mixtures of polyurethane resins are described, for example, in DE-A-43 39 085, DE-A-39 36 794, DE-A-43 44 063, DE-A-41 15 042, DE-A-41 15 015, DE-A-43 23 896, DE-A-41 22 265, DE-A-42 28 510, DE-A-196 43 802, EP-A-089 497, EP-A-297 576.

It is also possible to use, as the lacquering-up binder, the water-dilutable polyurethane resin described for preparing pigment pastes according to the invention, wherein the polyurethane resins may have an identical or different composition.

The lacquering-up binder may be contained at, for example, 30 to 95 wt. %, preferably 40 to 80 wt. %, with respect to the solids content of the entire surface coating agent.

Surface coating agents prepared with pigment pastes according to the invention may also contain a cross-linking agent. The cross-linking agents may be, for example, formaldehyde condensation resins such as phenol/formaldehyde and amine/formaldehyde condensation resins, and also blocked and non-blocked polyisocyanates. Amine resins which are suitable as cross-linking agents are, for example, alkylated condensates which are prepared by reacting aminotriazines and amidotriazones with aldehydes. Here, amines or amine group-containing compounds such as melamine, guanamine, benzoguanamine or ureas are condensed with aldehydes, in particular formaldehyde, by known processes in the presence of alcohols such as methanol, ethanol, propanol, butanol or hexanol.

Polyisocyanates which are suitable as cross-linking agents are, for example, any organic polyisocyanates with aliphatically, cycloaliphatically, araliphatically and/or aromatically bonded free isocyanate groups. They are liquid at room temperature or are liquefied by means of adding an organic solvent. The polyisocyanates generally have a viscosity, at 23° C., of 1 to 6000 mPas, preferably more than 5 and less than 3000 mPas. These types of polyisocyanates are generally known and are described, for example, in DE-A 38 29 587 or DE-A 42 26 243.

The polyisocyanates are preferably polyisocyanates or polyisocyanate mixtures with exclusively aliphatically and/or cycloaliphatically bonded isocyanate groups with an average NCO functionality of 1.5 to 5, preferably 2 to 3.

"Lacquer polyisocyanates" based on hexamethylene diisocyanate, 1-isocyanato-3,3,5-trimethyl-5-isocyanatomethyl-cyclohexane (IPDI) and/or bis(isocyanatocyclohexyl)-methane and the biuret, allophanate, urethane and/or isocyanurate group-containing derivatives of these diisocyanates known per se, for example, are especially suitable. Triisocyanates such as nonane triisocyanate may also be used. Sterically hindered polyisocyanates are also especially well-suited for this purpose. Examples of these are 1,1,6,6-tetramethyl-hexamethylene diisocyanate, 1,5-dibutyl-pentamethylene diisocyanate, p- or m-tetramethylxylylene diisocyanate and the corresponding hydrogenated homologues. These diisocyanates may also be reacted in an appropriate manner to give higher functional compounds, for example by trimerisation or by reaction with water or trimethylolpropane.

Blocked polyisocyanates may also be used as cross-linking agents. These are, for example, the polyisocyanates mentioned above which have been blocked with conventional blocking agents. Alkyl monoalcohols, phenols, oximes, amines, phthalimide or β-keto compounds may be used, for example, as blocking agents.

Other cross-linking agents which are known in the lacquer industry, however, may also be used, provided the corresponding reactive groups are available in the binder used.

The cross-linking agents may be used individually and as a mixture.

These are cross-linking agents conventionally used in the lacquer industry, which are extensively described in the literature and are available as commercial products. The cross-linking agents may be contained for example, at 0 to 35 wt. %, preferably 5 to 25 wt. %, with respect to the solids content of the entire surface coating agent.

If cross-linking agents are intended to be used in the surface coating agents, then the choice of cross-linking agent is guided by the cross-linkable functional groups in the lacquering-up binder(s) and/or the paste binder. Particularly advantageous are those which contain cross-linking agents which react with hydroxyl groups since then the paste binder can be incorporated into the cross-linking reaction via its hydroxyl groups. In this case, it is not absolutely necessary that the lacquering-up binder also contains cross-linkable functional groups. The lacquering-up binder may also be, for example, a physically drying binder so that a cross-linking reaction takes place only between the paste resin and the cross-linking agent.

The aqueous surface coating agents prepared with pigment pastes prepared according to the invention may also contain water, small proportions of organic solvents and conventional lacquer additives. Examples of conventional lacquer additives are flow control agents, agents which affect the rheology, such as highly disperse silica or polymeric urea compounds, thickeners such as cross-linked polycarboxylic acids or polyurethanes, defoamers, wetting agents, anti-cratering agents and hardening accelerators. The additives are used in conventional amounts, known to a person skilled in the art. Furthermore, the aqueous surface coating agents may contain cross-linked polymer microparticles.

Effect pigments such as, for example, the previously mentioned aluminium and/or interference pigments, may also be added to the aqueous surface coating agents in the conventional way, e.g. in the form of a solvent mixture and not in the form of a pigment paste which contains a paste resin.

Some organic solvent may be present in the surface coating agents, preferably not more than 20 wt. %, particularly preferably not more than 15 wt. %. The organic solvents are preferably miscible with water. They are conventional lacquer solvents. These may arise from preparation of the binder or be added separately. Examples of such solvents are the solvents already mentioned above for use when preparing pigment pastes according to the invention.

To prepare the surface coating agents, the pigment pastes, the lacquering-up binder(s) and the other constituents are thoroughly mixed together in a conventional manner, known to a person skilled in the art, and homogenised in a conventional way. Due to the good wetting properties of the paste binder, lacquering up takes place with retention of the dispersed status, i.e. flocculation of the pigments is prevented.

If coloured metallic effect lacquers are to be prepared, it is beneficial to prepare one pigment paste with the colour-providing pigment and, separately, one pigment paste with the metal pigments and then to combine the two pigment pastes during formulation of the surface coating agents.

Surface coating agents which contain pigment pastes according to the invention may be formulated on the basis of physically drying or chemically cross-linking binders. If these are, for example, two-component surface coating agents, the binder components which react with each other must be stored separately and may be mixed with each other only shortly before application.

Generally, if required, the products may be adjusted to spraying viscosity with water or organic solvents prior to application.

The hardening conditions are governed by the choice of binder and possibly of cross-linking agent. The surface coating agents require no stoving, given an appropriate choice of cross-linking agent, e.g. polyisocyanate cross-linking agents, and may be hardened at room temperature or force-hardened at elevated temperatures, e.g. up to 80° C., preferably 60° C. However, they may also be hardened at elevated temperatures of, for example, 80 to 150° C., in the case of, for example, melamine resins and/or blocked polyisocyanates.

Aqueous surface coating agents which contain pigment pastes according to the invention are particularly suitable for preparing colour and effect-providing base layers and pigmented topcoat layers in a multi-layered lacquering process.

The preferred area of application is the lacquering of vehicles and vehicle parts. The pigment pastes and the surface coating agents containing them can be used, depending on the hardening conditions, for both vehicle repair lacquering (hardening temperatures of, for example, 20 to 80° C.) and also for vehicle mass-production lacquering (hardening temperatures of, for example, 100 to 140° C.).

Other industrial applications are, however, also possible.

Therefore the invention also provides use of surface coating agents containing pigment pastes according to the invention in a process for preparing a multi-layered lacquer, wherein a colour and/or effect-providing basecoat layer consisting of a surface coating agent containing a pigment paste according to the invention is applied to a substrate which has previously been coated with primer and filler, and a clear lacquer layer is applied to this basecoat layer either after drying or hardening or wet-on-wet, optionally after a brief evaporation period. Basically any known unpigmented or transparently pigmented surface coating agents such as, for example, are conventionally used for lacquering vehicles, are suitable for use as the clear lacquer. This may be a single component or two-component clear lacquer, based on solvent or water, or a powder clear lacquer.

Furthermore, the invention also provides use of surface coating agents containing a pigment paste according to the invention in a process for preparing a multi-layered lacquer, wherein a pigmented topcoat layer consisting of a surface coating agent containing a pigment paste according to the invention is applied to an optionally previously coated substrate, e.g. a substrate previously coated with primer and filler, and this topcoat layer is hardened, optionally after a brief evaporation period.

The surface coating agent is applied by conventional methods, preferably using spray application.

Metal and plastic substrates, in particular the substrates known in the car industry, are suitable as substrates, such as e.g. iron, zinc, aluminium, magnesium, stainless steel or its alloys, and also polyurethanes, polycarbonates or polyolefins.

Pigment pastes according to the invention and also the aqueous lacquers prepared therefrom are storage-stable and exhibit no deposition of the pigments even after long periods of storage. The pigment pastes and the water lacquers containing them are also frost-resistant. High-gloss coatings with high chemical-resistance and very high hardness are obtained. If pigment pastes with metal pigments, in particular aluminium pigments, are prepared and incorporated into appropriate surface coating agents, then these surface coating agents have a considerably smaller proportion of solvent than metal effect lacquers prepared via the conventional route using a solvent mixture of aluminium pigments. The surface coating agents exhibit a very good metallic effect. In contrast to high molecular weight dispersions or emulsions, the polyurethaneurea paste resins used in pigment pastes according to the invention are resistant to shear forces so that they are especially suitable for rubbing in the pigments. Due to their very good wettability, particularly highly concentrated pastes may be prepared.

Pigment pastes according to the invention, in particularly white pigmented pastes, produce surface coating agents with good covering power. A deep black shade may also be formulated using pigment pastes according to the invention.

Pigment pastes according to the invention always exhibit uniformly reproducible coloristic and binding properties and are therefore very suitable for preparing standardised mixed lacquers, which are used for example to prepare repair lacquers.

The invention will be explained in more detail in the examples given below.

1ST EXAMPLE

Preparing a Polyurethaneurea Dispersion

Items 1–3 are each weighed into a 2 l flask with a stirrer and thermometer, heated to 80° C. under a protective gas and the temperature is then kept constant until the dimethylolpropionic acid has fully dissolved. The mixture is cooled to 50° C., item 4 is added and the mixture is then again heated to 80° C. The mixture is held at 80° C. until the isocyanate value (with respect to the solution) is 4.2 to 4.5%. Then the mixture is cooled to 40° C. and items 5 and 6 are added together (exothermic reaction). After one hour at 80° C., the isocyanate value is less than 0.1%. Then item 7 is added at 80° C. After 15 min, the mixture is diluted with item 8, adjusted to a solids content of about 35% and made homogeneous by stirring for one hour at 50° C.

In the following. items 1 to 8 for polyurethane dispersions are cited. PW means parts by weight.

VE water: Fully de-salted or deionised water prepared by distillation or with the aid of ion exchangers.

Polyurethane Dispersion 1:

| | | |
|---|---|---|
| 1. | 18.00 PW | commercially available aliphatic linear polyester based on adipic acid, isophthalic acid and neopentyl glycol with an OH value of 112 |
| 2. | 2.35 PW | dimethylolpropionic acid |
| 3. | 6.48 PW | N-methylpyrrolidone |
| 4. | 12.25 PW | isophorone diisocyanate |
| 5. | 2.40 PW | monoethanolamine |
| 6. | 2.40 PW | butoxyethanol |
| 7. | 2.25 PW | a 1:1 mixture of dimethylethanolamine and VE water |
| 8. | 53.87 PW | VE water |

Final Values:

Solids (30 min, 150° C.): 35% in N-methylpyrrolidone/butoxyethanol/VE water

Acid value: 29

MEQ (amine): 36.0 (milliequivalents of amine with respect to 100 g solid resin)

Degree of neutralisation: about 70%

OH value: 63

Viscosity (measured at 25° C. with a rotary instrument with a rate of shear of 231 s$^{-1}$): 1.53 Pas Urea group content: 114 mmol in 100 g solid resin Urethane group content: 201 mmol in 100 g solid resin Polyurethane Dispersion 2:

| | | |
|---|---|---|
| 1. | 17.16 PW | commercially available aliphatic linear polyester based on adipic acid, isophthalic acid and neopentyl glycol with an OH value of 112 |
| 2. | 2.24 PW | dimethylolpropionic acid |
| 3. | 6.18 PW | N-methylpyrrolidone |
| 4. | 11.68 PW | isophorone diisocyanate |
| 5. | 3.93 PW | diethanolamine |
| 6. | 3.93 PW | butoxyethanol |
| 7. | 1.80 PW | a 1:1 mixture of dimethylethanolamine and VE water |
| 8. | 53.08 PW | VE water |

Final Values:

Solids (30 min, 150° C.): 36.2% in N-methylpyrrolidone/butoxyethanol/VE water

Acid value: 27.5

MEQ (amine): 27.6

Degree of neutralisation: about 56%

OH value: 120

Viscosity (measured at 25° C. with a rotary instrument with a rate of shear of 231 s$^{-1}$): 2.07 Pas Urea group content: 103 mmol in 100 g solid resin Urethane group content: 187 mmol in 100 g solid resin Polyurethane Dispersion 3:

| | | |
|---|---|---|
| 1. | 17.94 PW | commercially available polycarbonatediol with an OH value of 115 mg KOH/g |
| 2. | 2.34 PW | dimethylolpropionic acid |
| 3. | 6.50 PW | N-methylpyrrolidone |
| 4. | 12.32 PW | isophorone diisocyanate |
| 5. | 2.39 PW | monoethanolamine |
| 6. | 2.39 PW | butoxyethanol |
| 7. | 2.20 PW | a 1:1 mixture of dimethylethanolamine and VE water |
| 8. | 53.92 PW | VE water |

Final Values:

Solids (30 min, 150° C.): 35% in N-methylpyrrolidone/butoxyethanol/VE water

Acid value: 28.0

MEQ (amine): 35.0

Degree of neutralisation: about 70%

OH value: 63

Viscosity (measured at 25° C. with a rotary instrument with a rate ofshear of 231 s$^{-1}$): 1.81 Pas Urea group content: 114 mmol in 100 g solid resin Urethane group content: 203 mmol in 100 g solid resin Polyurethane Dispersion 4:

| 1. | 16.16 PW | commercially available polytetrahydrofuran with an OH value of 115 mg KOH/g |
|---|---|---|
| 2. | 2.11 PW | dimethylolpropionic acid |
| 3. | 5.85 PW | N-methylpyrrolidone |
| 4. | 11.10 PW | isophorone diisocyanate |
| 5. | 3.70 PW | diethanolamine |
| 6. | 3.70 PW | butoxyethanol |
| 7. | 2.02 PW | a 1:1 mixture of dimethylethanolamine and VE water |
| 8. | 55.36 PW | VE water |

Final Values:

Solids (30 min, 1 50° C.): 35.1% in N-methylpyrrolidone/butoxyethanol/VE water

Acid value: 25.9

MEQ (amine): 34.4

Degree of neutralisation: about 74.5%

OH value: 120

Viscosity (measured at 25° C. with a rotary instrument with a rate of shear of 231 s$^{-1}$): 1.17 Pas Urea group content: 100 mmol in 100 g solid resin Urethane group content: 184 mmol in 100 g solid resin

2ND EXAMPLE

Preparing Pigment Pastes 2.1. Preparing a Black Paste

The following constituents are mixed together and dispersed in a pearl mill:

43.0 wt. % of polyurethane dispersion 1

16.0 wt. % of colorant carbon black 29.5 wt. % of VE water 7.0 wt. % of a 10% strength dimethylethanolamine solution 4.0 wt. % of a commercially available wetting agent 0.5 wt. % of silicone defoamer 2.2. Preparing a White Paste The following constituents are mixed together and dispersed in a dissolver:

26.0 wt. % of polyurethane dispersion 2

68.0 wt. % of titanium dioxide 2.0 wt. % of VE water 2.0 wt. % of butoxyethanol 1.0 wt. % of a 10% strength dimethylethanolamine solution 1.0 wt. % of a commercially available wetting agent 2.3. Preparing a Bronze Paste The following constituents are thoroughly mixed together, with stirring:

49.0 wt. % of polyurethane dispersion 3

46.0 wt. % of a commercially available 65% strength bronze paste 5.0 wt. % of n-butanol 2.4. Preparing an Iriodine Paste 60.0 wt. % of polyurethane dispersion 4 and 40.0 wt. % of a commercially available Iriodine pigment are thoroughly mixed together, with stirring.

The pigment pastes prepared in this way are each easy to process. They are storage-stable and exhibit no sedimentation of the pigments, even after a storage period of 12 months. The pigment pastes are frost-resistant. To check for frost-resistance, the pastes were frozen at −5° C. and −10° C. and held at this temperature for 72 hours. Then, the material was thawed out at room temperature over a period of 24 hours. Direct comparison after thawing, after 7 days and 28 days with each of the untreated pigment pastes showed that the treated pigment pastes had only a slightly increased viscosity when compared with the untreated pigment pastes.

3RD EXAMPLE

Preparing an Aqueous Base Lacquer 3.1 Preparing a Black Aqueous Basecoat Lacquer The following constituents were thoroughly mixed together, with stirring:

15.07 wt. % of a polyurethane dispersion in accordance with DE-A-196 43 802, preparation example 1, polyurethane dispersion A)

17.84 wt. % of a polyurethane dispersion in accordance with DE-A- 196 43 802, preparation example 2, polyurethane dispersion B)

22.80 wt. % of black paste in accordance with example 2.1

29.30 wt. % of VE water 5.45 wt. % of butoxyethanol 2.20 wt. % of Shellsol® T 5.71 wt. % of a commercial acrylate thickener (10% strength aqueous solution)

1.63 wt. % of 10% strength dimethylethanolamine solution 3.2 Preparing a White Aqueous Basecoat Lacquer The following constituents were thoroughly mixed together, with stirring:

15.05 wt. % of a polyurethane dispersion in accordance with DE-A-196 43 802, preparation example 1, polyurethane dispersion A)

17.81 wt. % of a polyurethane dispersion in accordance with DE-A- 196 43 802, preparation example 2, polyurethane dispersion B)

29.40 wt. % of white paste in accordance with example 2.2

24.95 wt. % of VE water 5.45 wt. % of butoxyethanol 5.71 wt. % of a commercial acrylate thickener (10% strength aqueous solution)

1.63 wt. % of 10% strength dimethylethanolamine solution 3.3 Preparing a Metallic Aqueous Basecoat Lacquer The following constituents were thoroughly mixed together, with stirring:

19.56 wt. % of a polyurethane dispersion in accordance with DE-A-196 43 802, preparation example 1, polyurethane dispersion A)

23.15 wt. % of a polyurethane dispersion in accordance with DE-A-196 43 802, preparation example 2, polyurethane dispersion B)

10.00 wt. % of bronze paste in accordance with example 2.3

32.92 wt. % of VE water
3.83 wt. % of butoxyethanol
1.00 wt. % of n-butanol
7.42 wt. % of a commercial acrylate thickener (10% strength aqueous solution)
2.12 wt. % of 10% strength dimethylethanolamine solution 3.4 Preparing an Iriodine Aqueous Basecoat Lacquer The following constituents were thoroughly mixed together, with stirring:

15.96 wt. % of a polyurethane dispersion in accordance with DE-A- 196 43 802, preparation example 1, polyurethane dispersion A)
18.89 wt. % of a polyurethane dispersion in accordance with DE-A-196 43 802, preparation example 2, polyurethane dispersion B)
25.00 wt. % of Iriodine paste in accordance with example 2.4
28.24 wt. % of VE water
3.13 wt. % of butoxyethanol
1.00 wt. % of n-butanol
6.05 wt. % of a commercial acrylate thickener (10% strength aqueous solution)
1.73 wt. % of 10% strength dimethylethanolamine solution The aqueous base lacquers obtained in this way are storage-stable for a period of at least 36 months.

Shortly before application a commercially available polyisocyanate cross-linking agent based on trimeric HDI was added to each in an amount such that the ratio by equivalents of hydroxyl groups to isocyanate groups was 1:1.

The aqueous lacquers were applied to metal substrate which had been pre-coated with conventional primers and fillers and then, after a short evaporation time, overpainted with a solvent-based 2-component clear lacquer (based on polyhydroxyacrylate resin/polyisocyanate) and hardened for 30 minutes at 60° C. The surface coatings obtained exhibit very good hardness and chemical-resistance and good covering power; the metallic lacquers have a very good metallic effect, high optical brightness and good adhesion to the substrate.

What is claimed is:

1. A pigment paste comprising at least one paste resin and at least one pigment in a pigment to binder weight ratio of 0.3:1 to 20:1 and optionally a liquid solution selected from the group consisting of water, organic solvent and conventional lacquer additives;

wherein the paste resin contains at least one water-dilutable hydroxy-functional polyurethaneurea resin having a urea group content (calculated as —NHCONH—) of 10 to 300 mmol in 100 g of solid paste resin, a urethane group content (calculated as —NHCOO—) of 20 to 300 mmol in 100 g of solid paste resin, an OH value of 20 to 250 and a number average molecular weight Mn of 1000 to 20000 g/mol, wherein the polyurethaneurea resin is formed by the following steps:

A) preparing an NCO group-containing polyurethane prepolymer by reacting:
1) at least one hydroxy-functional compound selected from the group consisting of polyols and diols having a number average molecular weight Mn of 360 to 8000 g/mol;
2) at least one polyisocyanate; and
3) at least one compound which has at least one group that reacts with isocyanate and at least one group that is ionic or capable of forming ions;

B) reacting the NCO group-containing polyurethane prepolymer prepared in step A with at least one hydroxy-functional monoamine and optionally with at least one polyol in ratios by weight such that the resulting polyurethaneurea resin has the said hydroxyl values and said proportions of urea and urethane group content;

C) at least partially neutralizing groups in the polyurethaneurea resin prepared in steps A and B which are ionic or can be converted into ionic groups, said neutralization occurring before or after step B and resulting in the transfer of said polyurethaneurea resin to the aqueous phase.

2. A pigment paste according to claim 1, wherein the water-dilutable hydroxy-functional polyurethaneurea resin has a urea group content (calculated as —NHCONH—) of 20 to 250 mmol in 100 g of solid resin, a urethane group content (calculated as —NHCOO—) of 80 to 250 mmol in 100 g of solid resin, an OH value of 40 to 200, an acid value of 18 to 65 and a number average molecular weight Mn of 1500 to 15000 g/mol.

3. A pigment paste according to claim 1, wherein the hydroxy-functional compound of Step A 1 is a linear or branched compound having an OH functionality of 2 to 3, an OH value of 50 to 250 and a number average molecular weight Mn of 360 to 8000 g/mol.

4. A pigment paste according to claim 1, wherein the hydroxy-functional compound of step A 1 is selected from the group consisting of polyesterpolyols, polycarbonatepolyols, poly(meth)acrylatepolyols and polylactonepolyols.

5. A process of preparing a pigment paste according to claim 1 comprising the steps of:

A) preparing an NCO group-containing polyurethane prepolymer by reacting:
1) at least one hydroxy-functional compound selected from the group consisting of polyols and diols having a number average molecular weight Mn of 360 to 8000 g/mol;
2) at least one polyisocyanate; and
3) at least one compound which has at least one group that reacts with isocyanate and at least one group that is ionic or capable of forming ions;

B) reacting the NCO group-containing polyurethane prepolymer prepared in step A with at least one hydroxy-functional monoamine and optionally with at least one polyol in ratios by weight such that the resulting polyurethaneurea resin has the said hydroxyl values and the said proportions of urea and urethane group content;

C) at least partially neutralizing groups in the polyurethaneurea resin prepared in steps A and B which are ionic or can be converted into ionic groups, said neutralization occurring before or after step B and resulting in the transfer of said polyurethaneurea resin to the aqueous phase; and D) dispersing at least one pigment in the polyurethane resin in a pigment to binder ratio of 0.3:1 to 20:1 and optionally adding a liquid solution selected from the group consisting of water, organic solvent and conventional lacquer additives.

6. An aqueous surface coating agent, comprising at least one water-dilutable binder, a pigment paste according to claim 1, and optionally cross-linking agent, solvent, and conventional lacquer additives.

7. An aqueous surface coating agent according to claim 6, wherein the water-dilutable binder comprises at least one chemically cross-linking or physically drying binder.

8. A color and effect-providing basecoat layer in a multi-layered lacquer, wherein said color and effect-providing basecoat layer is comprised of an aqueous surface coating agent according to claim 6.

9. A pigmented topcoat layer in a multi-layered lacquer, wherein said pigmented topcoat layer is comprised of an aqueous surface coating agent according to claim 6.

* * * * *